United States Patent
Wolf et al.

(10) Patent No.: US 7,222,804 B2
(45) Date of Patent: May 29, 2007

(54) ARRANGEMENT FOR THE ADJUSTMENT OF A SHEARBAR WITH RESPECT TO A CHOPPER ASSEMBLY AND A METHOD OF ADJUSTMENT THEREOF

(75) Inventors: Helmut Wolf, Zweibrücken (DE); Steffen Clauss, Rieschweiler-Mühlbach (DE); Manfred Engel, Grosssteinhausen (DE)

(73) Assignee: Deere & Company, Moline, IL (US)

( * ) Notice: Subject to any disclaimer, the term of this patent is extended or adjusted under 35 U.S.C. 154(b) by 246 days.

(21) Appl. No.: 11/092,525

(22) Filed: Mar. 29, 2005

(65) Prior Publication Data
US 2005/0218254 A1    Oct. 6, 2005

(30) Foreign Application Priority Data
Apr. 1, 2004    (DE)    ...................... 10 2004 016 089

(51) Int. Cl.
*B02C 25/00*    (2006.01)
(52) U.S. Cl. .......................................... 241/30; 241/37
(58) Field of Classification Search ................. 241/37, 241/222, 30, 242
See application file for complete search history.

(56) References Cited

U.S. PATENT DOCUMENTS

| 4,205,797 | A | 6/1980 | Bennett, Jr. et al. |
| 2005/0005586 | A1 | 1/2005 | Schmidt et al. |

FOREIGN PATENT DOCUMENTS

| DE | 100 21 659 | 5/2000 |
| DE | 100 26 296 | 5/2000 |
| EP | 0 291 216 | 5/1988 |
| EP | 0 335 256 | 3/1989 |
| EP | 1 080 630 | 8/2000 |
| EP | 1 151 662 | 4/2001 |

*Primary Examiner*—Mark Rosenbaum (57) ABSTRACT

The invention concerns an arrangement for the adjustment of the position of a shearbar with respect to knives of a chopper assembly. The arrangement includes a first adjusting drive to position the first end of the shearbar at a predetermined first spacing from the knives and a second adjusting drive to position the second end of the shearbar with respect to the knives until a spacing measurement arrangement indicates that the spacing between the shearbar and the knives is less than a threshold value. An analogous procedure is applied to the first adjusting drive. On the basis of the measurement values the shearbar is brought into a position that corresponds to a desired gap between the shearbar and the knives. Each of the first spacing and the second spacing are greater than the desired gap between the shearbar and the knives.

16 Claims, 6 Drawing Sheets

ARRANGEMENT FOR THE ADJUSTMENT OF A SHEARBAR WITH RESPECT TO A CHOPPER ASSEMBLY AND A METHOD OF ADJUSTMENT THEREOF

BACKGROUND

1. Field of the Invention

The invention concerns an arrangement for the adjustment of the position of a shearbar with respect to the knives of a chopper assembly, for use in a harvesting machine, and a method of adjusting the arrangement.

2. Related Technology

In forage harvesters the spacing between the chopper knives and the shearbar is a significant value for the quality of the cut and the power required for the cutting operation. As a rule, shearbars of this type are arranged so that they can be adjusted with respect to the chopper drum by means of electric motors, where each end of the shearbar is associated with an electric motor. A spacing sensor, that as a rule is configured as a knock sensor or a magnetic spacing sensor, detects a signal that contains information regarding the spacing between the shearbar and the nearest knife of the knives on the chopper drum.

In the state of the art various procedures are known in order to bring the shearbar into the desired position relative to the chopper drum by an automatic control of the electric motors.

EP 0 291 216 A suggests initially moving both ends of the shearbar away from the chopper drum. Then one end of the shearbar is next moved towards the chopper drum, until a sensor detects a contact between the shearbar and the chopper drum. Then this particular end is moved away from the chopper drum by a first distance and the other end of the shearbar is moved towards the chopper drum, until a sensor detects a contact between the shearbar and the chopper drum. Then the other end is again withdrawn from the chopper drum by the first spacing. This procedure is performed successively until both motors bring about a contact between the shearbar and the chopper drum upon their activation. Then the shearbar is retracted from the chopper drum at both ends by a path of from approximately 0.127 to 0.254 mm.

EP 0 335 256 A describes an arrangement in which one end of the shearbar is moved in the direction of the chopper drum by a first motor until a contact exists. Then the shearbar is again retracted by the first motor until no contact exists. Then the other adjusting motor is activated until a contact exists and is activated in the opposite direction until the contact between the shearbar and the chopper drum disappears. This adjusting process is repeated once where after each of the last adjustment steps the desired gap on each side is adjusted by retracting the shearbar.

DE 100 21 659 A proposes that one end of the shearbar be moved at first in the direction of the chopper drum until a contact occurs and then retracting it by a spacing that corresponds to the desired gap. Then the other end is moved to the chopper drum until a contact occurs and then retracted again from the chopper drum by a spacing that corresponds to the desired gap. Alternatively the shearbar is at first brought into a parallel orientation to the chopper drum and then the final spacing is adjusted by moving both ends synchronously. For such an adjusting operation a very precisely-operating spacing sensor is required.

EP 1 080 630 A proposes that one end of the shearbar be moved at first to the chopper drum until an appropriate gap exists. Then the other end is moved to the desired spacing.

Thereby the known procedures for the adjustment of the shearbar relative to the chopper drum always include a step in which a first end of the shearbar is brought into the vicinity of the chopper drum. Following this, the other end of the shearbar is moved to the chopper drum. This procedure is based on the fundamental assumption that the chopper assembly is manufactured and ground as a cylinder or a concave shape. The end of the shearbar that was not moved in each case is located at a relatively small spacing from the chopper assembly, so that the assumption can be made that an approach or a contact between the shearbar and the chopper assembly occurs first at the end of the shearbar that was moved on the basis of the cylindrical or concave shape of the chopper drum. In each case the target position of the shearbar is then determined on the basis of the measured values.

This procedure is problematic if the shape of the chopper assembly is convex. This shape can result, for example, from higher wear in the outer region of the chopper assembly on the basis of greater amounts of crop due to non-uniform supply of crop, in that larger amounts of crop are supplied to the outside of the chopper assembly compared to the supply in the center, or on the basis of grinding processes in which the grinding stone operates for a longer time at the edge than in the center of the chopper assembly.

Figure 1:
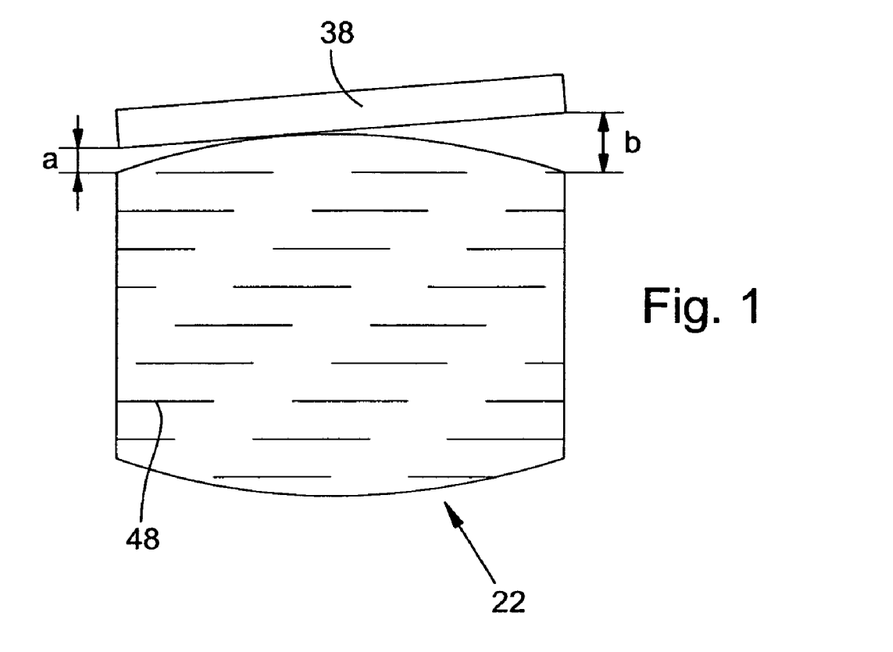
FIG. 1 shows a schematic view of a convex chopper drum with a shearbar that is in contact at approximately the center of a chopper drum.

To illustrate this point, reference is made to FIG. 1. The chopper assembly 22 is convex, where the convexity "a" is shown to an exaggerated degree for purposes of illustration. In actual cases it may amount, for example, to 0.5 mm. at a width of the chopper assembly 22 of approximately 700 to 850 mm. and a diameter of the chopper assembly 22 of approximately 600 mm. Depending on the distance "b" of the end of the shearbar 38 that was not repositioned, the shearbar 38 comes into contact with the knives 48 further towards the edge or in the center of the chopper assembly 22. The spacing "b" between the chopper assembly and the end of the shearbar 38 that was not adjusted is relatively small, so that the contact between the shearbar 38 and the chopper assembly 22 occurs in the vicinity of its center.

In case the spacing "b" between the end of the shearbar 38 that was not repositioned and the chopper assembly 22 differs upon the approach of the other end of the shearbar to the chopper assembly the contact thereby occurs at various different axial positions. In a procedure in which the shearbar is moved towards the chopper assembly in successive alternating steps at both ends, the orientation between the enveloping circle described by the knives and the shearbar depends upon chance, and a parallel orientation is difficult to achieve.

The problem underlying the invention is seen in the need to provide an arrangement for the adjustment of a shearbar, in which a parallel adjustment between the shearbar and the enveloping circle described by the knives is possible even with convex chopper assemblies.

SUMMARY

In overcoming the limitations and drawbacks of the prior art, the present invention provides an arrangement for adjustment of a position of a shearbar relative to knives of a chopper assembly. The arrangement includes a pair of adjusting drives to move respective ends of the shearbar with respect to the knives of the chopper assembly. The arrangement further includes a spacing measurement arrangement to provide information regarding the position of the shearbar with respect to the knives to a control arrangement.

The first adjusting drive positions the first end of the shearbar a predetermined first spacing from the knives and the second adjusting drive positions the second end of the shearbar with respect to the knives until the second end of the shearbar is equal to or less than a threshold distance from the knives. The adjusting drives then perform an analogous operation on the shearbar to determine the position of a predetermined second spacing and a second threshold distance.

The adjusting drives then position the ends of the shearbar with respect to the knives such that the ends are respectively located first and second desired distances from the knives. The first and second predetermined spacing from the knives are respectively greater than the first and second desired distances from the knives, such that the ends of the shearbar can be properly aligned with potentially-convex end portions of the chopper assembly.

Figure 2:
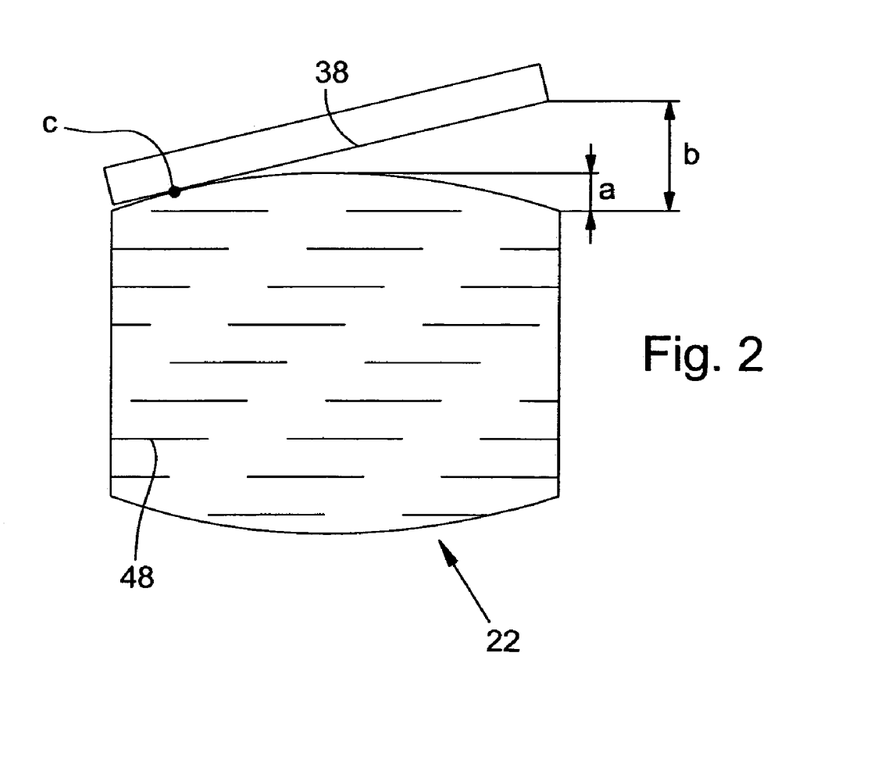
FIG. 2 shows a schematic view of a convex chopper drum with a shearbar that is in contact with a chopper drum at approximately the edge of the chopper drum.

Due to the greater distance between the shearbar and the knives compared to the state of the art (the first and the second distance) of each end of the shearbar in each case that was not adjusted, that is greater than the desired gap between the chopper drum and the shearbar, information is generated regarding the position of the enveloping circle of the knives that can be obtained at the edge of the chopper assembly. In a convex chopper assembly, therefore, the situation shown in FIG. 2 is realized. More specifically, in FIG. 2 the spacing was selected at a magnitude considerably larger so that the contact between the shearbar 38 and the chopper assembly 22 occurs adjacent to the left edge, at contact point "c". Therefore, the first threshold distance is shown on the left edge where the respective components 38, 22 abut each other, being generally equal to zero. Also, on the right edge of the shearbar 38 in FIG. 2, the convexity "a" of the convex chopper assembly and the distance "b" of the predetermined second spacing are shown, where the predetermined second spacing "b" is substantially greater than the convexity "a". In this way a parallel orientation of the shearbar relative to the chopper assembly can be obtained even with a convex chopper assembly. The quality of the cut is improved and the power requirement during the chopping process is reduced.

The first and the second spacing "b" in FIG. 2 can be calculated on the basis of an empirical value "a" for the maximum convexity or crowning of a chopper assembly and the width of the chopper assembly. The value for "b" is the result of the tangent to the enveloping circle of the chopper assembly at the point of contact of the shearbar and its intersection with the vertical of the other end of the chopper assembly.

After information has been detected regarding the position of the shearbar, in which the spacing measurement arrangement had provided a signal that the spacing is less than the threshold value of the spacing between the shearbar and chopper assembly, the shearbar then must still be brought into the desired position. This movement is preferably performed in such a way that both adjusting drives are activated simultaneously in order to obtain the desired spacing between the shearbar and the chopper assembly in the shortest possible time.

The generation of the parallelism of the shearbar to the enveloping circle of the knives as described is fundamentally required only after major repairs or modifications to the chopper assembly, for example, after a replacement of several or of all the knives, the shearbar or changes to the adjustment mechanism. All other adjustment processes, for example, after a grinding process fundamentally do not require the establishment of parallelism, that is relatively time consuming. Therefore it is proposed that after first establishing the parallelism the adjustment drives be activated synchronously only without first orienting the ends of the shearbar parallel to the chopper assembly, that is, to bring them into the first or the second spacing from the knives and to bring the other end of the shearbar into contact with the knives. Thereby the adjustment processes can be shortened considerably. On the other hand a further process that must be performed is a further parallel shift of both ends of the shearbar, in order to obtain a desired cutter gap, at which time another approach to the knives can be performed. This proposal deserves independent inventive significance, and it can also be applied to arrangements for the adjustment of the position of a shearbar in which the parallelism of the shearbar to the chopper assembly is performed by methods other than those described here, for example, the state of the art explained initially.

The adjustment drives have a mechanical play that may be larger or smaller. This play can be detected when the shearbar is moved away from the knives, for example, by generating information about the adjusting path, that is required in order to permit the output signal of the spacing measurement arrangement to drop below the associated output signal, which points to the fact that the spacing between the shearbar and the knives is less than a threshold value. If the shearbar is subsequently to be brought into the position corresponding to the desired gap, the control arrangement considers the measured play automatically. The play of the two different adjusting drives, that may differ in themselves, is particularly relevant here, these can be detected and automatically equalized. With each movement the play of the adjusting drive with the greater play is repositioned in the direction of the subsequent movement of the shearbar by the difference of the two values of play.

For the subsequent relief of the stress in the adjusting drives the shearbar can be moved again in the direction of the chopper assembly.

Any desired sensor can be used as spacing measurement arrangement. Knock sensors, in particular, can be used that detect mechanical vibrations caused by contact of the shearbar with the knives and magnetic spacing sensors that interact with permanent magnets and detect changes in the magnetic field generated by knives moving past in the vicinity.

The control arrangement requires information regarding the immediate position of the adjusting drives or the ends of the shearbar associated with them. This information can be derived from an activation signal conducted to the adjusting drive, for example by the use of a stepper motor as adjusting drive. If the adjusting drive is a direct current motor, information regarding its position can be derived from the duration of the activation of the adjusting drive. Another possibility consists of detecting the position of the end of the shearbar or its adjusting drive by means of an associated position sensor.

The invention can be applied to any desired chopper assembly with an adjustable shearbar. This may be, in particular, open and closed chopper drums of self-propelled forage harvesters and disk wheel choppers of attached or towed forage harvesters.

BRIEF DESCRIPTION OF THE DRAWINGS

The drawings show an embodiment of the invention that shall be described in greater detail in the following.

DETAILED DESCRIPTION

Figure 3:
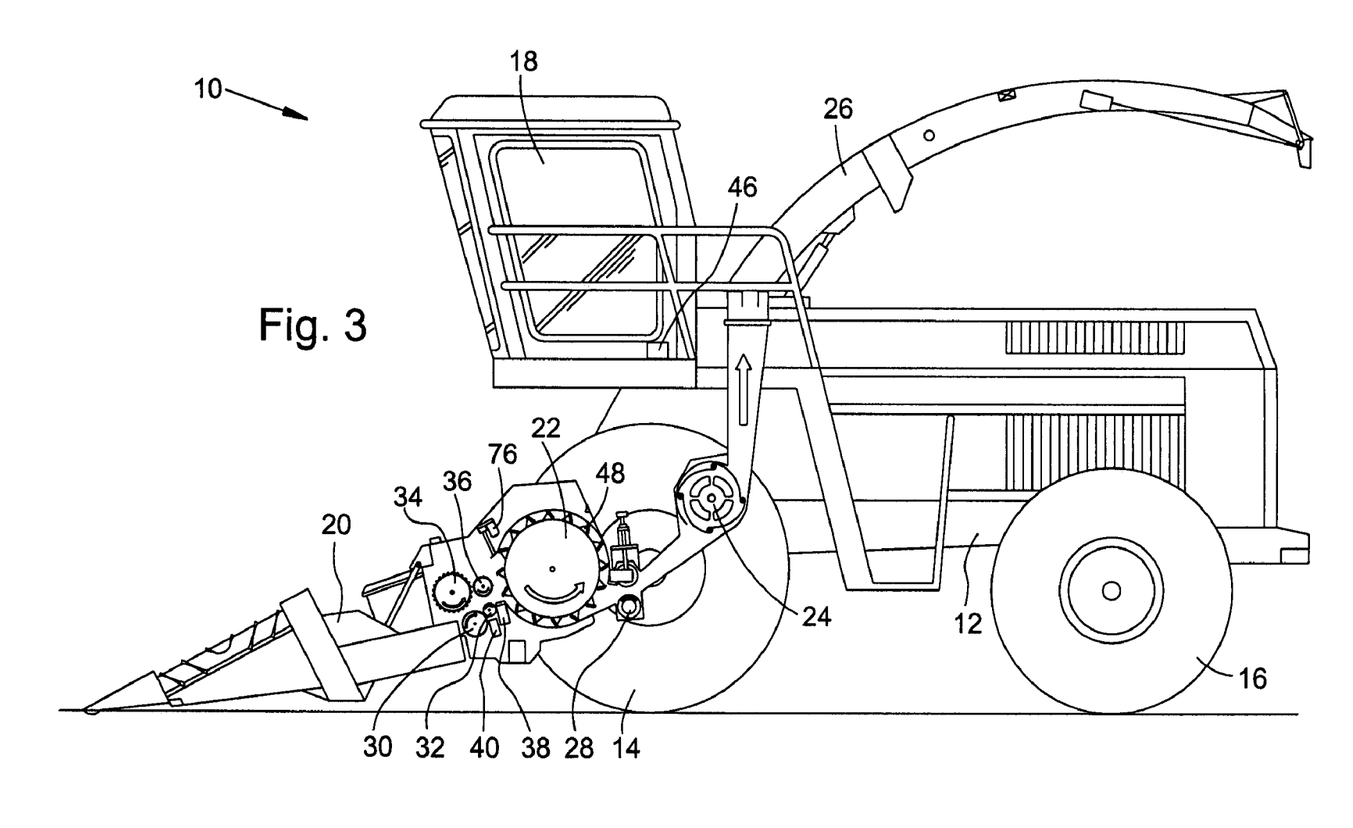
FIG. 3 shows a partial sectional side view of a harvesting machine to which the arrangement, according to the invention, can be applied.

FIG. 3 shows a harvesting machine 10 in the form of a self-propelled forage harvester that is supported on a frame 12 that is carried by front and rear wheels 14 and 16. The operation of the harvesting machine 10 is controlled from an operator's cab 18 from which a crop recovery arrangement 20 can be controlled visually. Crop taken up from the ground, for example, corn, grass or the like, is conducted to a chopper assembly 22 in the form of a chopper drum that is equipped with knives 48 that chop the crop into small pieces and deliver it to a conveyor arrangement 24. A post-chopper reduction arrangement 28 extends between the chopper assembly 22 and the conveyor arrangement 24, through which the crop to be conveyed is conducted tangentially to the conveyor arrangement 24. The crop leaves the harvesting machine 10 to an accompanying trailer over a rotating discharge duct 26.

The crop is transported between the crop recovery arrangement 20 and the chopper assembly 22 by lower rough pressing rolls 30, 32 and upper rough pressing rolls 34, 36. The knives 48, distributed around the circumference of the chopper assembly 22, interact with a shearbar 38, in order to chop the crop. The shearbar 38 is provided at its end with a first and a second adjusting drive 40, 42, that are arranged for the movement of the shearbar 38 in the horizontal direction towards and away from the chopper drum 22. Moreover a spacing sensor 44 is arranged on the shearbar 38. Furthermore a grinding arrangement 76 is associated with the chopper assembly 22 in order to automatically sharpen the knives 48.

Figure 4:
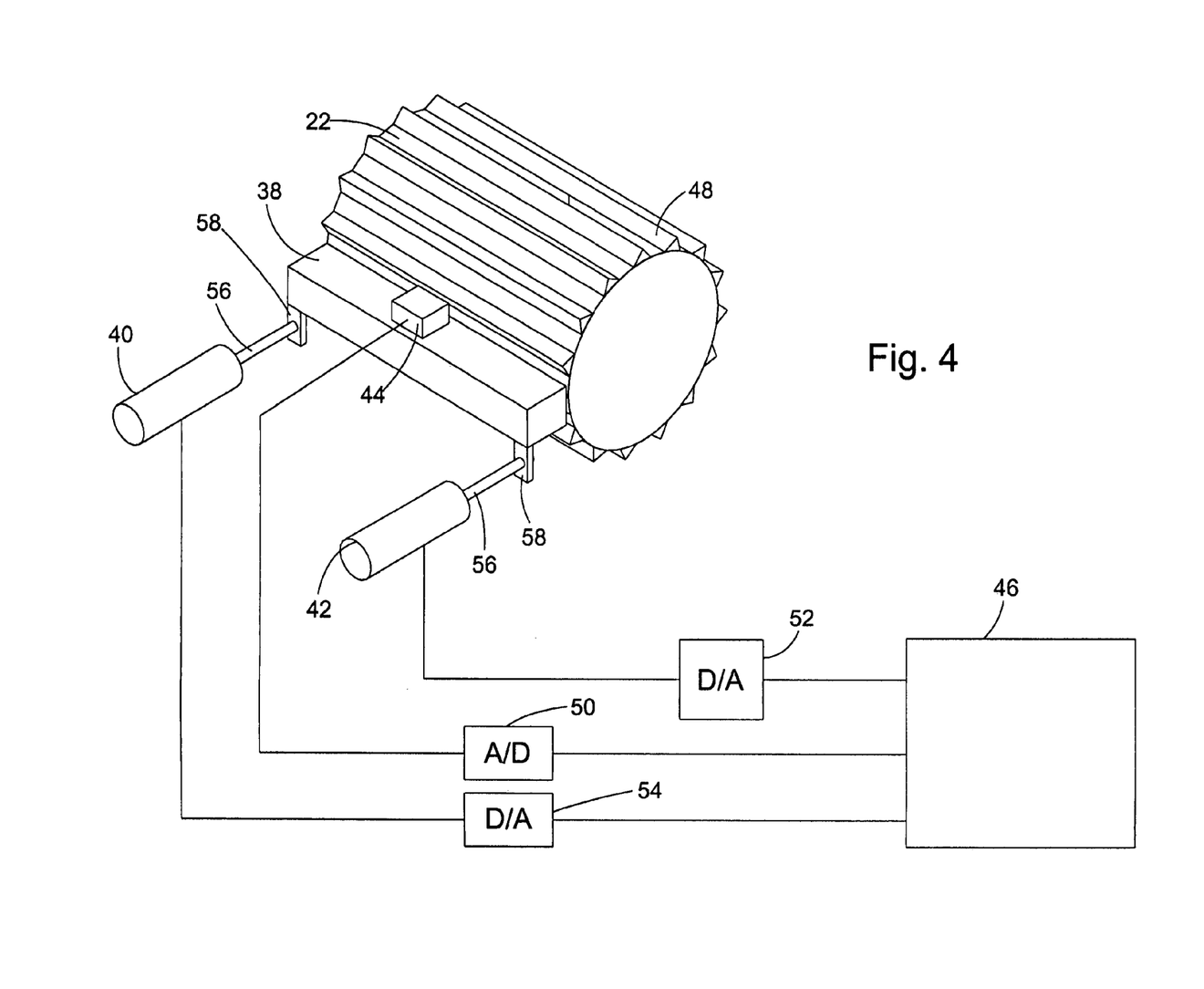
FIG. 4 shows a schematic perspective view of the arrangement, according to the invention, for the adjusting of the position of the shearbar with respect to the knives of the chopper assembly.

An electronic control arrangement 46, operating digitally, is positioned in the operator's cab 18, it is connected with the spacing sensor 44 over an analog-digital converter 50 and with the adjusting drives 40, 42 over digital-analog converters 52, 54. The spacing sensor 44 is a knock sensor that is known in the art and it detects mechanical vibrations that are excited in the shearbar 38 by knives 48 which touch the shearbar 38. The spacing sensor 44 sends signals to the control arrangement 46, which can detect corresponding information in the case of a contact of the knives 48 with the shearbar 38. It would also be possible to associate each end of the shearbar 38 with its own spacing sensor 44. In the embodiment shown the adjusting drives 40, 42 are stepper motors. The immediate position of the adjusting drives 40, 42, and thereby the shearbar 38, are known to the control arrangement 46 on the basis of the number of adjusting impulses supplied by the control arrangement 46 to the adjusting drives 40, 42. In order to calibrate the position of the adjusting drives 40, 42 there is the possibility of moving the latter against a fixed stop, for example, against the stationary chopper assembly 22 or against stops arranged at the other end of the adjusting path. When the stop is reached a signal is provided to the control arrangement 46 by an increase in the current requirement for the adjusting drives 40, 42. The adjusting drives 40, 42 move the ends of the shearbar 38 by means of threaded rods 56 that interact with threads in sections 58 of the shearbar 38 or a retainer to which the shearbar 38 is fastened.

Figure 5A:
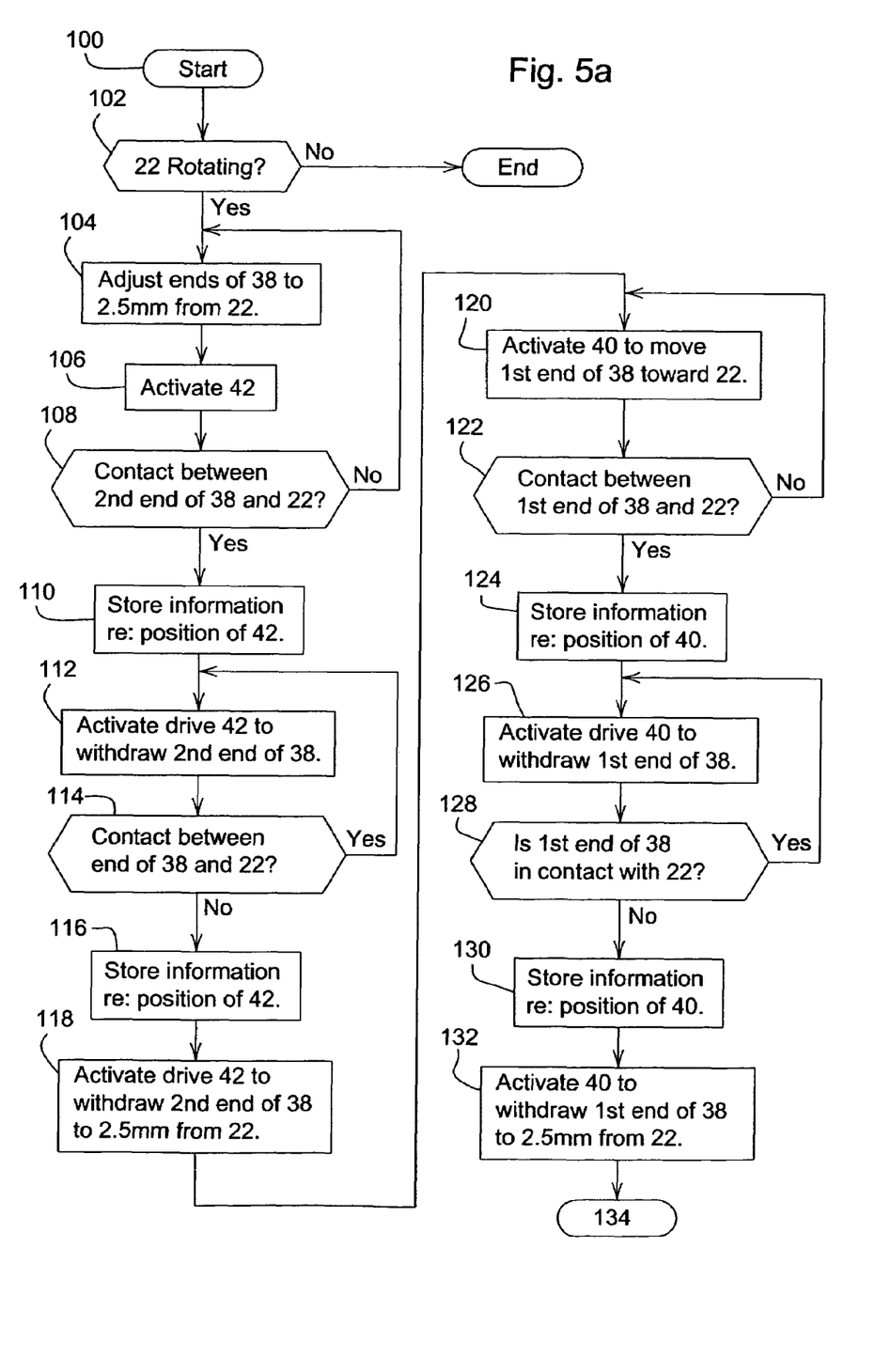
FIGS. 5a and 5b show a flow chart according to which the arrangement for adjusting the position of the shearbar operates.
Figure 5B:
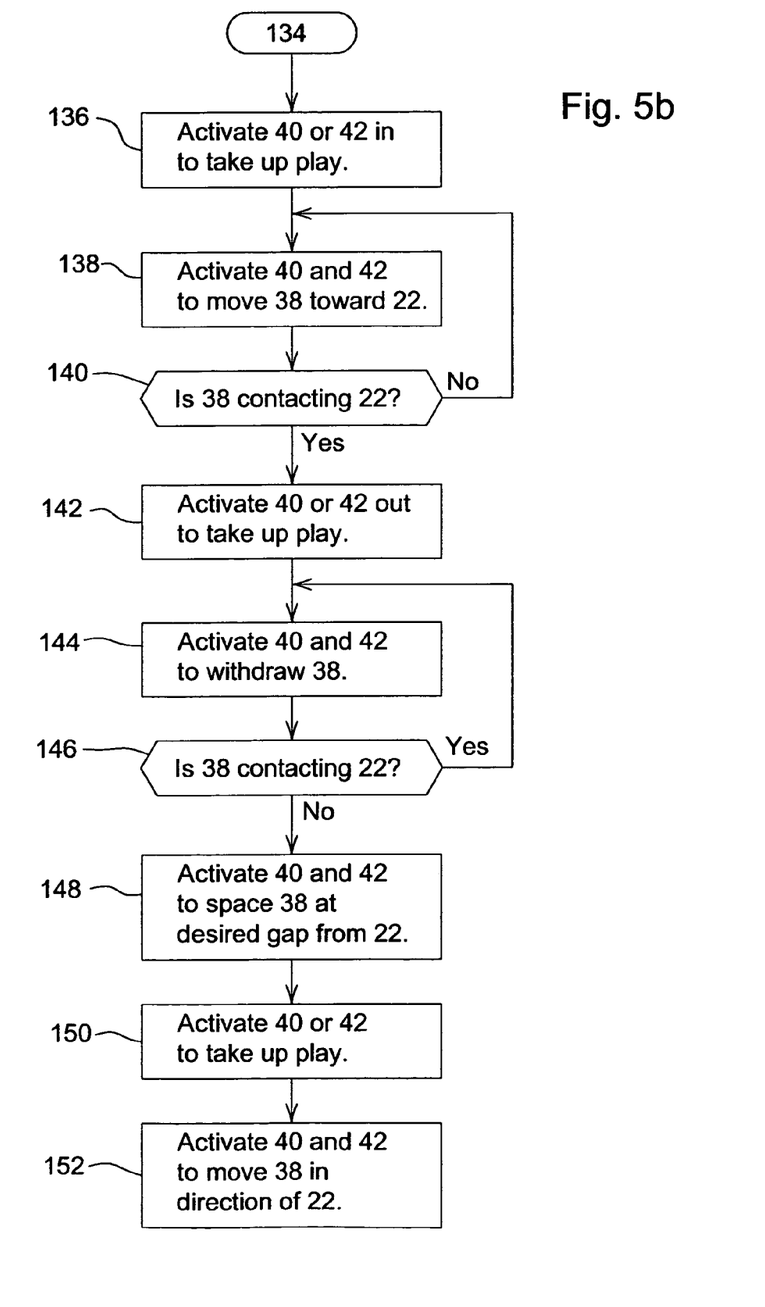

After a knife 48 or several knives 48 of the chopper assembly 22 or the shearbar have been replaced, as may occur in the case of wear, damage, or repair of the respective components, the adjustment mechanism between the adjusting drives 40, 42 and the shearbar 38 may cause the parallelism of the shearbar 38 to the enveloping circle of the knives 48 may be diminished and the size of the intervening gap may be unknown. In this case, the control arrangement 46 will proceed as shown in FIGS. 5a and 5b.

Following a corresponding input from the operator into an input arrangement connected with the control arrangement 46 or automatically, after the operations described have been detected by sensors or corresponding inputs have been provided to the control arrangement 46, the adjustment routine is initiated in step 100. In step 102 the control arrangement 46 inquires whether the chopper assembly 22 rotates, because an adjustment of the shearbar 38 is preferably performed while the chopper assembly is rotating. If this is not the case, the process is ended, and if necessary, the operator is notified. If, on the other hand, the chopper assembly 22 is rotating, step 104 follows in which the adjusting drives 40, 42 are induced to bring the ends of the shearbar 38 associated with them into a spacing of 2.5 mm. from the chopper assembly 22. This step 104 is based on the assumption that the shearbar 38 is mounted in its target position and the adjusting drives 40, 42 are located in known positions. If this is not the case, corresponding input can be provided to the control arrangement 46, or a further routine, not shown, is called up with which the position of the shearbar 38 can be detected automatically; for example, it can be moved against an outer stop and the currents to drive the adjusting drives 40, 42 can be measured. The step 104 does not require the utmost in precision, but it is sufficient if the adjusting drives 40, 42 are brought into the desired position within certain tolerances.

Following that the first adjusting drive 40 is deactivated and the first end of the shearbar 38 associated with it remains at this relatively large spacing from the chopper assembly 22.

If the second adjusting drive 42 is already located before step 104 between the position to which it is to be controlled and a position closer to the chopper assembly 22, it can also remain there during step 104, in order to shorten the adjusting time. In step 106 the second adjusting drive 42 is induced to move the second end of the shearbar 38 in the direction of the chopper assembly 22. In step 108 the spacing sensor 44 determines whether contact has occurred. If the signal does not indicate contact between the shearbar 38 and the chopper assembly 22, step 106 again follows. Otherwise the assumption is made that the shearbar 38 touches the knives 48 of the chopper assembly 22. Information regarding the actual position of the second adjusting drive 42 is stored in memory (step 110) and the second adjusting drive 42 is instructed in step 112 to again withdraw the second end of the shearbar 38 from the chopper assembly 22.

Step 114 asks the question whether the signal of the spacing sensor 44 still points to a contact between the shearbar 38 and the knives 48. If this is not the case, step 112 follows, otherwise step 116. In step 116, information regarding the actual position of the second adjusting drive 42 is stored in memory. The memory of the position generated in step 110 and the memory of the position generated in step 116 cooperate to store information regarding the mechanical play of the adjusting drive 42. Then, in step 118, the second adjusting drive 42 is induced to withdraw the second end of the shearbar 38 through a distance of 2.5 mm. from the knives 48.

Thereupon, in step 120, the first adjusting drive 40 is analogously induced to move the end of the shearbar 38 in the direction of the chopper assembly 22. In step 122 the spacing sensor 44 determines whether contact has occurred. If its signal does not point to a contact between the shearbar 38 and the chopper assembly 22, then step 120 again follows. Otherwise the assumption is made that the shearbar 38 touches the knives 48 of the chopper assembly 22. Information regarding the actual position of the first adjusting drive 40 is stored in memory (Step 124) and the first adjusting drive 40 is instructed in step 126 to again withdraw the first end of the shearbar 38 from the chopper assembly 22.

In step 128 the question is asked whether the signal of the spacing sensor 44 still indicates contact between the shearbar 38 and the knives 48. If this is not the case, step 126 follows, otherwise step 130. In step 130, information regarding the actual position of the first adjusting drive 40 is stored in memory. The memory of the position generated in step 124 and the memory of the position generated in step 130 cooperate to store information regarding the play of the adjusting drive 40. Then in step 132 the first adjusting drive 40 is induced to withdraw the first end of the shearbar 38 from the knives 48 by a distance of 2.5 mm.

Now the shearbar 38 is oriented parallel to the enveloping circle of the knives 48 of the chopper assembly 22, since both ends have been withdrawn by the same distance of 2.5 mm. from the knives. The relatively large distance between the chopper assembly 22 and each of the stationary ends of the shearbar 38 increases the likelihood that the approach or contact between the shearbar 38 and the chopper assembly 22 occurs in each case at the end of the shearbar 38 that was adjusted and not closer to the center of the chopper assembly 22. Therefore the case shown in FIG. 1 is avoided; the situation shown in FIG. 2 is safely assured.

More specifically, in FIG. 2 the spacing was selected at a magnitude considerably larger so that the contact between the shearbar 38 and the chopper assembly 22 occurs adjacent to the left edge, at contact point "c". Therefore, the first threshold distance is shown on the left edge where the respective components 38, 22 abut each other, being generally equal to zero. Also, on the right edge of the shearbar 38 in FIG. 2, the convexity "a" of the convex chopper assembly and the distance "b" of the predetermined second spacing are shown, where the predetermined second spacing "b" is substantially greater than the convexity "a". In this way a parallel orientation of the shearbar relative to the chopper assembly can be obtained even with a convex chopper assembly.

The distance used in steps 104, 118 and 132 can also be determined before the adjusting of the shearbar 38 on the basis of actual parameters in which, for example, the operating time of the chopper assembly 22 and the resulting convexity based on experience is determined and used to establish the spacing.

In steps 106 through 116 and 120 through 130 information was obtained regarding the immediate play of the adjusting drives 40, 42. As a rule these values of play differ in magnitude. In order to assure a parallel adjustment of the shearbar 38 in the following adjustment processes, a play difference equalization is performed before each movement. Here the adjusting drive 40 or 42 with the larger play in each case is moved by the difference in the magnitude of the play in the direction into which the shearbar 38 is to be repositioned.

A first such movement is performed in step 134. The one of the adjusting drives 40, 42 with the larger play is induced to move the shearbar 38 in the direction of the chopper drum 22 through a distance that corresponds to the difference in the play of the two adjusting drives 40, 42.

Step 138 follows in which both adjusting drives 40, 42 are activated simultaneously in order to move the shearbar 38 in the direction of the chopper assembly 22. In step 140 the spacing measurement arrangement 44 determines whether contact has occurred. If no contact exists, step 138 follows, otherwise step 142. In that step the adjusting drive 40 or 42, whose play is larger as determined by steps 116 and 130, is moved backwards by the difference in the two magnitudes of play. Thereby non-parallelism are avoided that may be due to unequal magnitudes of play or hysteresis of the adjusting drives 40, 42.

Step 144 follows in which both adjusting drives 40, 42 are induced to withdraw the shearbar 38 from the chopper assembly 22. In step 146 the question is raised whether the spacing sensor 44 is still delivering a signal that points to a contact between the shearbar 38 and the knives 48. If this is the case, step 144 again follows, otherwise step 148, in which the adjusting drives 40, 42 are induced to move the shearbar 38 to a spacing from the chopper assembly 22 that corresponds to the desired gap. This gap may be, for example, 0.2 mm. Following this, in step 150 the adjusting drive 40 or 42, whose play is larger as determined in steps 116 and 130, is moved ahead by the difference in the magnitudes of the play, in the direction of the chopper assembly 22. Finally the adjusting drives 40, 42 are induced to move the shearbar 38 on both sides in the direction of the chopper assembly 22, in order to relieve the stress in the mechanism and to avoid any recoil of the shearbar 38 during the following harvesting process.

Figure 6:
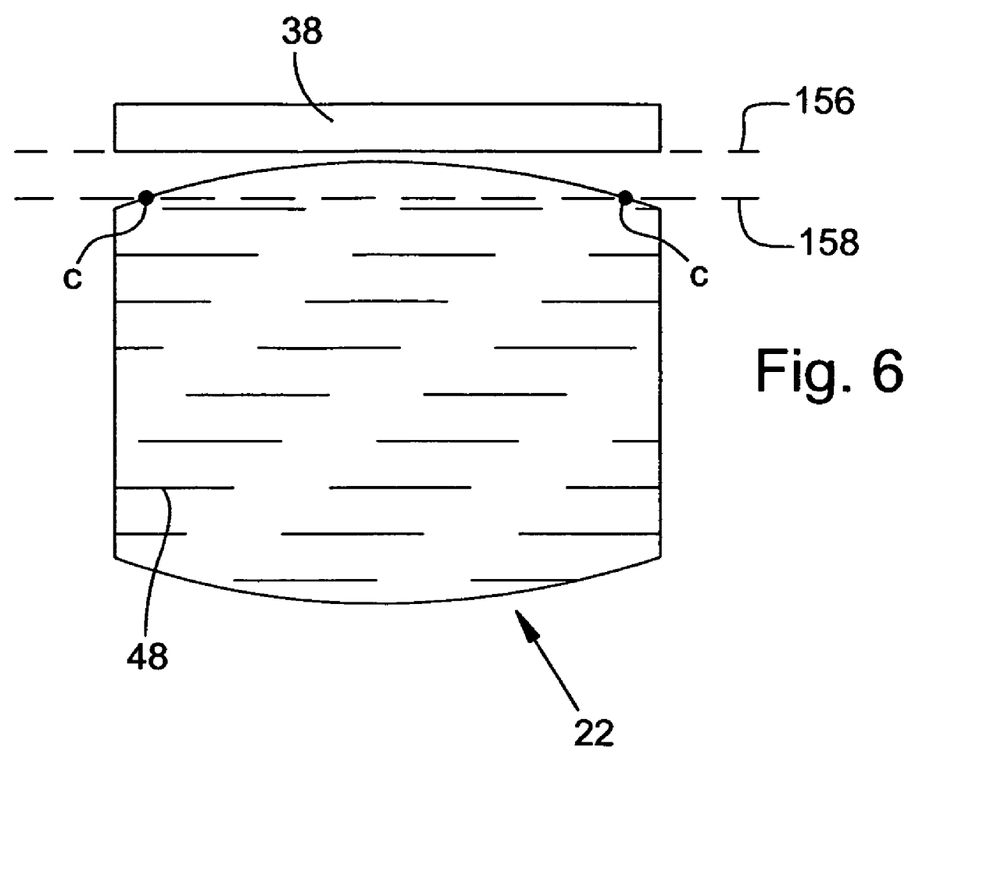
FIG. 6 shows a schematic view of a convex chopper drum with a shearbar that is properly aligned with the chopper drum.

Now the shearbar 38 is oriented parallel to the chopper assembly 22 and is spaced from it by the desired gap, as shown in FIG. 6. More specifically, the shearbar 38 extends along a line 156 that is parallel to a second line 158 extending through the respective contact points "c".

After a grinding process by means of the grinding arrangement 76, which is performed after a certain operating time, as induced by the operator or automatically, the shearbar 38 must be repositioned anew. Here, however, the steps 102 through 132 can be omitted, so that then the routine for the repositioning of the shearbar 38 includes only the steps 136 through 154. This process can be performed in a relatively short time.

It is therefore intended that the foregoing detailed description be regarded as illustrative rather than limiting, and that it be understood that it is the following claims, including all equivalents, that are intended to define the spirit and scope of this invention.

What is claimed is:

1. An arrangement for adjustment in the position of a shearbar relative to knives of a chopper assembly, the arrangement comprising:

a first adjusting drive configured to move a first end of the shearbar with respect to the knives of the chopper assembly;

a second adjusting drive configured to move a second end of the shearbar with respect to the knives of the chopper assembly;

a spacing measurement arrangement configured to provide information regarding a position of the shearbar with respect to the knives; and a control arrangement connected to the first adjusting drive, the second adjusting drive, and the spacing measurement arrangement to control the first and second adjusting drives;

the control arrangement being configured to cause the first adjusting drive to position the first end of the shearbar at a predetermined first spacing from the knives, the control arrangement configured to cause the second adjusting drive to position the second end of the shearbar with respect to the knives such that the spacing measurement arrangement indicates that the second end of the shearbar is equal to or less than a threshold distance from the knives while the first end of the shearbar is at the predetermined first spacing from the knives;

the control arrangement being configured to cause the second adjusting drive to position the second end of the shearbar at a predetermined second spacing from the knives, the control arrangement configured to cause the first adjusting drive to position the first end of the shearbar with respect to the knives such that the spacing measurement arrangement indicates that the first end of the shearbar is equal to or less than a second threshold distance from the knives while the second end of the shearbar is at the predetermined second spacing from the knives;

the control arrangement being configured to cause the first and second adjusting drives to position the first and the second ends of the shearbar with respect to the knives such that the first and second ends are respectively located first and second desired distances from the knives, the first and second desired distances based on the information regarding the position of the shearbar with respect to the knives when the first and second ends of the shearbar are at the first and second threshold distances, the first and second predetermined spacing from the knives being respectively greater than the first and second desired distances from the knives.

2. The arrangement as in claim 1, wherein the knives of the chopper assembly define a convex enveloping circle having outer edges, the first and the second predetermined spacings being sufficiently large such that each of the first and second ends of the shearbar is configured to respectively engage the outer edges of the enveloping circle when the other of the first and second ends of the shearbar is respectively positioned the first and second predetermined spacing from the knives.

3. The arrangement as in claim 2, wherein the shearbar is substantially parallel to the outer edges of the enveloping circle when the first and second ends of the shearbar are in the position that corresponds to the first and second desired distances from the knives.

4. The arrangement as in claim 3, wherein the control arrangement is configured to simultaneously activate both of the first and second adjusting drives to move the first and second ends of the shearbar to the first and second desired distances from the knives.

5. The arrangement as in claim 1, wherein the control arrangement is configured to adjust the first and second adjusting drives to positions corresponding to a desired gap between the shearbar and the knives.

6. The arrangement as in claim 5, wherein the control arrangement is configured to adjust the first and second adjusting drives to the positions corresponding to the desired gap between the shearbar and the knives based on respective play of each of the first and second ends of the shearbar.

7. The arrangement as in claim 1, wherein the control arrangement is configured cause the first and second adjusting drives to move the shearbar in the direction of the chopper assembly to reduce stress on the arrangement.

8. The arrangement as in claim 1, wherein the spacing measurement arrangement is one of a knock sensor and a magnetic spacing sensor.

9. The arrangement as in claim 1, wherein the control arrangement is configured to be operated to detect information regarding the position of one end of the shearbar, on the basis of one of an activation signal supplied to the adjusting drive, a time duration of the activation of the first or second adjusting drive, or a position sensor associated with the adjusting drive.

10. A method of adjusting a shearbar relative to knives of a chopper assembly in a harvester, the method of adjusting comprising:

positioning a first end of the shearbar at a predetermined first spacing from the knives and, while the first end of the shearbar is at the predetermined first spacing from the knives, moving a second end of the shearbar towards the knives until the second end of the shearbar is equal to or less than a threshold distance from the knives;

positioning the second end of the shearbar at a predetermined second spacing from the knives, and while the second end of the shearbar is at the predetermined second spacing from the knives, moving the first end of the shearbar towards the knives until the first end of the shearbar is equal to or less than a second threshold distance from the knives; and moving the shearbar with respect to the knives until the first and second ends are respectively located first and second desired distances from the knives, wherein the first and second desired distances are based on the information regarding the position of the shearbar with respect to the knives when the first and second ends of the shearbar are at the first and second threshold distances, and wherein the first and second predetermined spacings from the knives are respectively greater than the first and second desired distances from the knives.

11. The method of claim 10, further comprising the step of rotating the chopper assembly about an axis such that the knives define a convex enveloping circle having first and second ends, wherein the step of moving the first end of the shearbar towards the knives further includes causing the first end of the shearbar to engage the chopper assembly at a first contact point adjacent to the first end of the convex enveloping circle, and wherein the step of moving the second end of the shearbar towards the knives further includes causing the second end of the shearbar to engage the chopper assembly at a second contact point adjacent to the second end of the convex enveloping circle.

12. The method of claim 11, wherein the step of moving the shearbar with respect to the knives until the first and second ends are respectively located first and second desired distances from the knives includes positioning the shearbar parallel to a line extending through the first and second contact points.

13. The method of claim 10, further comprising the step of positioning shearbar to a position corresponding to a desired gap between the shearbar and the knives.

14. The method of claim 13, wherein the desired gap is generally equal to 0.2 millimeters.

15. The method of claim 13, further comprising the step of positioninq the shearbar with respect to the knives based on respective play of each of the first and second ends of the shearbar.

16. The method of claim 10, further comprising the step of moving the shearbar in the direction of the chopper assembly to reduce stress on the arrangement.

* * * * *